United States Patent Office 3,403,123
Patented Sept. 24, 1968

3,403,123
POLYVINYL HALIDE LATICES STABILIZED WITH DIAMMONIUM PHOSPHATE AND AMMONIUM HYDROXIDE
Isadore Nathan Cooperman and Milton W. Kline, Leominster, Mass., assignors to The Borden Company, New York, N.Y.
No Drawing. Filed Sept. 17, 1965, Ser. No. 488,233
3 Claims. (Cl. 260—29.6)

ABSTRACT OF THE DISCLOSURE

This invention relates to an aqueous latex comprising the reaction product resulting from the polymerization of a vinyl halide in the presence of an agent for stabilizing the resultant latex. The reaction product is stabilized against degradation due to the presence of iron ion and from pH decay. The invention also contemplates a process for accomplishing such stabilization which comprises reacting a vinyl chloride monomer in the presence of diammonium phosphate and ammonium hydroxide.

---

This invention relates to vinyl halide polymers and copolymers thereof in aqueous emulsion. More particularly it relates to aqueous emulsions of said polymers and copolymers which are stabilized in the presence of iron ions while alkaline pH levels are maintained in the latex.

Vinyl halide polymers and copolymers thereof may be prepared in aqueous acid or alkaline pH media. Alkaline polymerization has been used to advantage in cases where the catalyst of polymerization is sensitive to low pH conditions and is subject to degradation by the acid as for example potassium persulfate. Another advantage of alkaline polymerization is the chemical stability of the latex when combined with additives in the same alkaline pH range. A significant difference between the pH of the latex and the additive causes the latex to coagulate (become unstable). It has been found that even though polymerization has been initially carried out in the alkaline pH range, the pH of the latex drifted lower during storage over a period of several months thereby causing instability when subsequently combined with the additives. Addition of alkali and other bases to the latex does not prevent the drift of the pH. It is believed that the downward pH drift is enhanced by the presence in the latex of free iron ion. Although invention is not based upon this proposition, it is thought that halides of iron are formed by breakdown of the polymer which on hydrolysis forms the halide acid. Usual chelating agents added to the latex are ineffective to prevent downward pH drift.

The present invention provides an economical and unique method for substantially preventing inter-action between iron ion and halide polymer while concurrently preventing the downward pH drift of the latex while in the alkaline range.

Briefly stated the invention comprises a vinyl halide polymer and copolymers thereof in aqueous emulsion and a stabilizing agent for the polymer in the emulsion. The invention also comprises the method for stabilizing the latex in the presence of iron ion while concurrently maintaining the pH of the latex in the alkaline range. The stabilizing agent comprises diammonium phosphate and ammonium hydroxide.

It has been found that diammonium phosphate and ammonium hydroxide act to reinforce each other, in other words, there is a synergistic effect when the combination of these compounds are included in an alkaline latex. The downward pH drift over a period of time is substantially abated indicating that iron ion is tied up. The latter conclusion is supported by data showing latex stability in presence of iron.

As to materials the vinyl halide polymer may be any of the polymers or inter-polymers of which vinyl halide monomer is present in major proportions, as greater than 50% by weight. Vinyl halide monomers include vinyl chloride, vinyl bromide, vinylidene halides such as vinylidene chloride, vinylidene chlorofluoride, vinylidene fluoride and the like. Other monomers copolymerizable with said vinyl halide monomers include acrylic and methacrylic acid, alpha-hydrogen substitution products of acrylic acid such as halogen and lower alkyl, $C_1$–$C_8$ esters of said acrylic and methacrylic acids, $C_2$–$C_8$ alpha unsaturated dibasic carboxylic acids and anhydrides and $C_1$–$C_8$ esters and partial esters of said dibasic carboxylic acids as for example maleic, fumaric and itaconic acid. Other copolymerizable monomers include vinyl esters of $C_1$–$C_{18}$ acids as for example vinyl acetate, vinyl stearate and other similar polymerizable materials.

Other materials in the latex may include standard materials generally used in the polymerization and copolymerization of vinyl halide monomers. These include water soluble peroxy catalysts such as sodium persulfate, potassium persulfate, ammonium persulfate, sodium perborate, potassium perborate, and hydrogen peroxide. The preferable catalyst is potassium persulfate.

Surface active agents may be included, such as sodium oleate, sodium stearate, ammonium oleate, potassium palmitate, sodium myristate, and rosin or dehydrogenated rosin soaps. There may also be used synthetic saponaceous materials such as alkali fatty acid sulfates and alkaryl sulfonates, as for example, sodium lauryl sulfate and sodium isopropyl naphthalene sulfonate. Other agents include such materials as the dialkyl succinamates, the sodium salt of N-octadecyl-N-1,2-dicarboxyethyl sulfosuccinamate, and the like. Mixtures of two or more agents may also be used.

Other materials include modifiers for the polymer such as mercaptans, chloroethylenes, aldehydes, and synthetic and natural colloids such as polyvinyl alcohol, casein, lecithin, methyl cellulose, etc.

As to proportions, the monomer comprises vinyl halide in major proportions, in other words at least 50%, and preferably 70% and up to 100% by weight of the total monomers in the system.

The proportion of additives to the latex are within the usual range such as between about .01–0.5 part of catalyst for 100 parts of monomer, 0–10 parts of surface active agent for 100 parts of monomer, 0–10 parts colloids for 100 parts of monomer, and 0–10 parts of modifying agent for 100 parts of monomer.

As to the stabilizing agent, diammonium phosphate compound is used in proportion of between about 0.1–1 part by weight for 100 parts of monomer. The preferred proportion is between about 0.3–0.7 part.

Ammonium hydroxide is used in proportion sufficient to adjust the pH of the system to between about 7 and 10 and preferably within the range 7.5 to 9.5. Generally about 1–4 parts of ammonium hydroxide for each part of diammonium phosphate will adjust the pH within the desired range. By ammonium hydroxide, a standard solution of about 28% $NH_3$ in water is meant.

In the following examples, which illustrate the invention, the proportions expressed are in parts by weight.

Example I

Vinyl halide interpolymers may be prepared by reacting the monomers in the presence of additives in an agitated vessel at elevated temperatures, as between 75°–150° F. Polymerization time varies with conditions, reactants and additives employed. It has been found that the following typical formulations require about 16 hours at a temperature of about 125° F. in aqueous medium. (Proportions are parts by weight.)

TABLE I

|  | A | B |
|---|---|---|
| Vinyl halide monomer (vinyl chloride) | 100 | 80 |
| Comonomer (ethylacrylate) |  | 20 |
| Surface active agent (sodium dodecylbenzene sulfonate) | 3 | 3 |
| Catalyst (potassium persulfate) | .3 | .3 |
| Stabilizing agent: |  |  |
|   Diammonium phosphate | .5 | .5 |
|   Ammonium hydroxide | 1 | 1 |

Example II.—(pH stabilization)

By way of example latices were prepared as in Example I except that other bases and phosphate compounds as well as the separate components of the stabilizing agent of this invention were substituted for combined diammonium phosphate and ammonium hydroxide. The pH decay was noted and compared with a latex prepared as in Example IA. The proportions of the base and phosphate compound are as shown in Example I.

TABLE II [pH]

| Time (days) | (1) $NH_4OH$ | (2) $Na_2HPO_4$ $NaOH$ | (3) $(NH_4)_2HPO_4$ | (4) $(NH_4)_2HPO_4$ $NH_4OH$ |
|---|---|---|---|---|
| 0 | 9.0 | 9.0 | 7.5 | 9.0 |
| 2 | 8.3 | 8.6 | 7.5 | 9.0 |
| 4 | 8.1 | 8.4 | 7.4 | 8.9 |
| 6 | 8.0 | 8.3 | 7.3 | 8.9 |
| 8 | 8.0 | 8.2 | 7.1 | 8.8 |
| 10 | 7.9 | 8.0 | 7.0 | 8.8 |
| 40 | 7.1 | 7.5 | 6.2 | 8.0 |

Only Column 4 is part of the instant invention. The data shows that the stabilizing agent of this invention provides substantial reduction of the pH decay over a period of at least 40 days, and especially over the first 10 days. Other tests show that there is a comparable difference in pH drop over a period about 3 months.

Example III.—(Coagulation stabilization)

Latices were prepared as in Example I except that potassium phosphate was used in place of diammonium phosphate and ammonium hydroxide. $KH_2PO_4$ is used to illustrate results obtained when previously known additives are incorporated into the vinyl latex in connection with an iron complexing agent. Varying proportions of "Versene Fe-3 Specific" were added to the latex as well as to other latices made with (a) diammonium phosphate, with (b) ammonium hydroxide, and with (c) diammonium phosphate plus ammonium hydroxide. These were compared to a latex with diammonium phosphate and ammonium hydroxide, but with no "Versene Fe-3 Specific" added.

"Versene Fe-3 Specific" is a trade name for an organic complexing agent that forms extremely stable complexes with ferric iron in the pH range of 3.5 to 12.5. The formula of the active ingredient is given as $$C_6H_{12}O_4NNa$$

125 gms. of the various latices described were placed in 8 oz. glass jars. A 1″ wide, pre-weighted strip of sheet iron metal was placed into each jar and the jar closed.

At the end of regular time intervals the strips were removed, rinsed, dried and weighed. The weight increase was taken as coagulum buildup.

TABLE III.—GRAMS OF COAGULUM (DRY) ON METAL STRIP

| Time (hours) | (1) Latex- $KH_2PO_4$ | (2) Latex- $KH_2PO_4$ 1 drop "Fe-3" | (3) Latex- $KH_2PO_4$ 20 drops "Fe-3" | (4) Latex-$(NH_4)_2$ $HPO_4$- $NH_4OH$- 1 drop "Fe-3" | (5) Latex-$(NH_4)_2$ $HPO_4$- $NH_4OH$- 20 drops "Fe-3" | (6)[1] Latex-$(NH_4)_2$ $HPO_4$-$NH_4OH$ |
|---|---|---|---|---|---|---|
| 0 |  |  |  |  |  |  |
| 1 | 1.3 | 1.0 | .2 | .1 | .1 | .1 |
| 2 | 1.7 | 1.4 | .2 | .2 | .2 | .2 |
| 4 | 2.0 | 1.7 | .2 | .2 | .2 | .2 |
| 6 | 2.2 | 2.2 | .3 | .2 | .2 | .2 |
| 24 | 3.8 | 5.3 | .6 | .2 | .2 | .2 |

[1] Only column (6) is part of the instant invention.

The data shows the stabilizing agent is as good as the generally accepted standard for coagulation stabilization due to iron in latices.

Example IV

The latex of Example IA is prepared except that the vinylchloride is replaced separately and in turn with the other vinyl halide monomers herein disclosed.

Example V

The latex of Example IB is prepared except that the ethyl acrylate is replaced separately and in turn with the other monomers copolymerizable with said vinyl chloride monomer herein disclosed.

Example VI

The latex of Example IB is prepared except that the vinyl chloride is replaced separately and in turn with the other vinyl halide monomers herein disclosed.

The pH decay characteristics and coagulation stabilization properties of the latices of Examples IV—IV are comparable to Column 4 of Table II and Column 6 of Table III.

The latex is useful in the area of coatings namely, to protect and add color to substrates such as textiles, plastics as for example vinyl sheeting, and also to various cellulosic materials such as wood and paper. Usually, the latex is applied as by spraying or other coating methods to the substrate and the carrier is evaporated from the surface leaving a continuous film of polymer coating.

It will be understood that it is intended to cover all changes and modifications of the examples of the invention herein chosen for the purpose of illustration which do not constitute departure from the spirit and scope of the invention.

What is claimed is:

1. A method for stabilizing an aqueous latex in the presence of iron ion and preventing substantial pH decay, said latex including a vinyl halide selected from the group of vinyl chloride, vinyl bromide, vinylidene chloride, vinylidene chlorofluoride, and vinylidene fluoride, comprising the steps of:
   (1) admixing therewith a stabilizing agent consisting essentially of diammonium phosphate in the range of 0.1–1 part by weight for 100 parts monomers used in said latex, and ammonium hydroxide in an amount sufficient to raise the pH of the system into the range of about 7–10 and
   (2) polymerizing said vinyl halide in the presence of said stabilizing agent.

2. The method of claim 1 wherein:
   (1) said vinyl halide is copolymerized with monomers selected from the group consisting of:
      (a) an acrylic and methacrylic acid,
      (b) halogen and lower alkyl alpha-hydrogen substitution products of acrylic acid,
      (c) $C_1$–$C_8$ esters of acrylic and methacrylic acid,
      (d) $C_2$–$C_8$ alpha unsaturated dibasic carboxylic acids and anhydrides, (e) $C_1$–$C_8$ esters and partial esters of said dibasic carboxylic acids, and
(f) vinyl esters of $C_1$–$C_{18}$ acids, and
(2) the weight proportion of said vinyl halide is at least 50% of the total weight of said copolymer.

3. A method for preparing an aqeuous polyvinyl chloride latex which is stable in the presence of iron ion and which exhibits substantial pH stability against decay comprising the steps of:
(1) admixing with a vinyl chloride monomer, a stabilizer consisting essentially of
(a) a diammonium phosphate in proportion of about .3 part by weight for 100 parts of polyvinyl chloride, and
(b) ammonium hydroxide in proportion sufficient to raise the pH of the system into the range of about 7.5–9.5
(c) and polymerizing said vinyl chloride monomer in the presence of (a) and (b).

References Cited

UNITED STATES PATENTS

| | | | |
|---|---|---|---|
| 2,519,348 | 8/1950 | Burnell et al. | 260—29.6 |
| 2,576,720 | 11/1951 | Marks | 260—45.7 |

MURRAY TILLMAN, *Primary Examiner.*

W. J. BRIGGS, *Assistant Examiner.*